W. H. BRACE.
Torsion-Spring for Vehicle.
No. 199,256.        Patented Jan. 15, 1878.
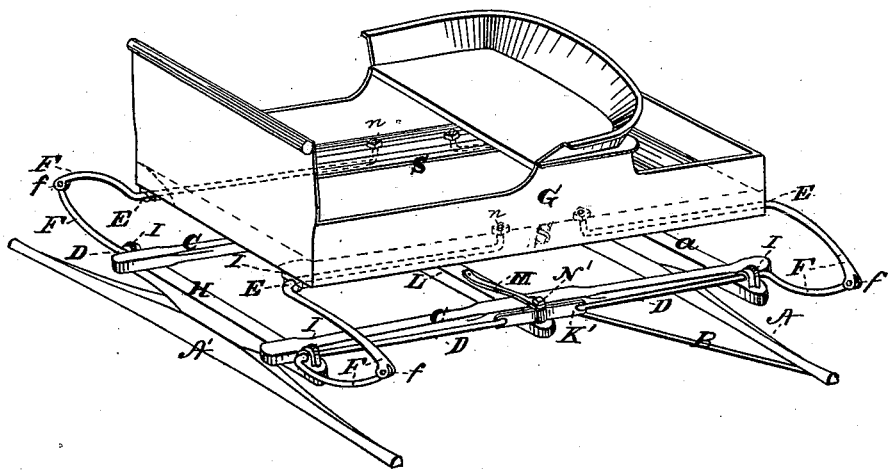
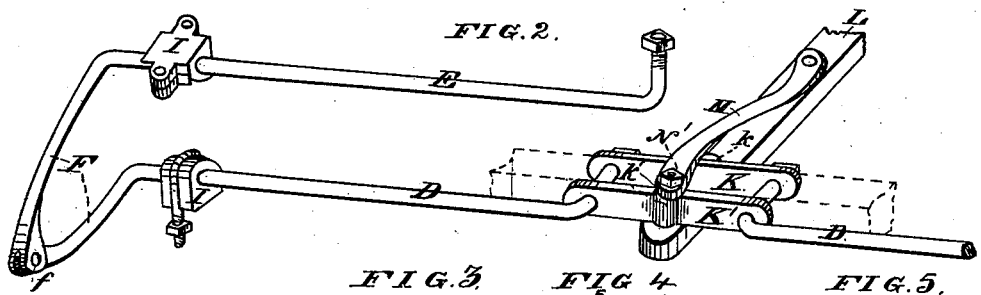
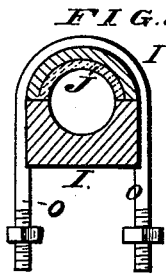 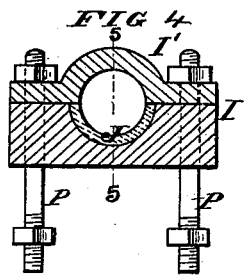 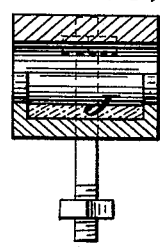
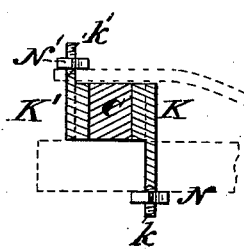
Witnesses
W. R. Edelen.
Chas J. Gooch
Inventor,
William H. Brace
By Knight Bros
Attorneys

UNITED STATES PATENT OFFICE.

WILLIAM H. BRACE, OF NUNDA, NEW YORK, ASSIGNOR OF ONE-HALF HIS RIGHT TO JUNIUS B. COUNTRYMAN, OF SAME PLACE.

IMPROVEMENT IN TORSION-SPRINGS FOR VEHICLES.

Specification forming part of Letters Patent No. 199,256, dated January 15, 1878; application filed December 8, 1877.

*To all whom it may concern:*

Be it known that I, WILLIAM H. BRACE, of Nunda, in the county of Livingston and State of New York, have invented certain new and useful Improvements in Torsion-Springs for Vehicles, of which the following is a specification:

My invention consists, first, in the combination of two parallel torsion-springs fixed longitudinally to the side bar and bed, respectively, and connected by jointed arms, as hereinafter described; second, in a mode of securing torsion-springs to the body of the vehicle, as hereinafter described; third, in a mode of constructing boxes for confining torsion-spring rods, as hereinafter described; fourth, in a device for holding the side bars from turning under the strain of torsion-springs, as hereinafter described.

In the accompanying drawings, Figure 1 is a perspective view of a wagon body and springs illustrating the invention. Fig. 2 is a perspective view of portions of the springs and their attachments on a larger scale. Fig. 3 is a transverse section of one of the confining-boxes on a still larger scale. Fig. 4 is a transverse section of one of the boxes in modified form. Fig. 5 is a longitudinal section of the same on the line 5 5, Fig. 4. Fig. 6 is a transverse section of one of the side bars and the clamping device employed for holding the same against turning.

A represents a portion of the rear axle; A', the front axle; H, the head-block, and C C side bars rigidly fixed in front to the said head-block H, and at back to a corresponding bar, a, mounted upon the rear axle A. Braces B (one shown) extend from near the extremities of the rear axle A to the centers of the side bars C C.

D E represent torsion-springs, formed at their extremities with semi-elliptic arms F F, jointed together at f. The lower springs D are fixed to the side bars C C, and the upper ones, E, in parallel position underneath the bed G. For the purpose of securing the torsion-springs firmly in position, their ends are bent at right angles, as shown, and are screw-threaded, the ends of the lower springs D being passed through the side bars C C, and the ends of the upper springs E through the sills S S of the bed, where they are firmly held by nuts n.

In order to hold the side bars C firmly against turning under the torsional strain of the lower springs D D, I clamp the said side bars firmly between plates K K', upon which are forged studs k k', the stud k being in one piece with the plate K, and projecting downward through the transverse stay-bar L, where it is fastened by a nut, N, and the stud k' projecting upward through the outer end of the brace M, where it is held by a nut, N'. The inner end of the brace M is firmly bolted to the stay-bar L.

The threaded ends of the spring-rods D D are passed through the plates K K', and fastened by nuts, as shown in Fig. 2.

In Fig. 2 the side bar is shown in dotted lines, and the stay-bar L and brace M in full lines.

In Fig. 6 the side bar C is shown in section, and the stay-bar and brace in dotted lines.

To hold the springs near the horizontal arms F, I employ boxes I, with caps I', inclosing cushions J, of rubber, leather, or other suitable material. The said boxes may be of various forms, two of which are illustrated in Figs. 3 and 4. They are secured either by clips O, as in Fig. 3, or by bolts P, as in Fig. 4. If simple bolts are used, they are preferably passed through ears or lugs formed to receive them in the ends of the boxes and their caps. The cushions within the boxes permit the caps to be secured tightly down upon the rods, so as to completely avoid rattling or squeaking, without binding on the springs so as to obstruct their free torsional movement.

Having thus described my invention, the following is what I claim as new therein and desire to secure by Letters Patent:

1. In a side-bar vehicle, the parallel and longitudinal torsion-springs D E, fixed in pairs to the side bars and bed, respectively, and connected at their working ends by jointed arms F F, as set forth.

2. The upper torsion-springs E, fastened to the bed by turning up their ends in vertical position, passing them through the sills S, and there securing them by nuts $n$, as explained.

3. The torsion-springs D E, fixed at their ends to the side bars and bed, respectively, and secured at their elbows by boxes I I and cushions J J, as explained.

4. The plates K K′, constructed with threaded studs $k$ $k'$, in combination with the side bars C C and stay-bar L and brace M, for securing said side bars against turning, substantially as set forth.

WILLIAM H. BRACE.

In presence of—
  OCTAVIUS KNIGHT,
  A. H. GALT.